(12) United States Patent
Zhao et al.

(10) Patent No.: US 12,150,077 B2
(45) Date of Patent: Nov. 19, 2024

(54) METHOD FOR NODE USED FOR WIRELESS COMMUNICATION AND APPARATUS

(71) Applicant: QUECTEL WIRELESS SOLUTIONS CO., LTD., Shanghai (CN)

(72) Inventors: Zheng Zhao, Shanghai (CN); Ling Lyu, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 18/601,931

(22) Filed: Mar. 11, 2024

(65) Prior Publication Data
US 2024/0284365 A1    Aug. 22, 2024

Related U.S. Application Data

(63) Continuation of application No. PCT/CN2023/076593, filed on Feb. 16, 2023.

(51) Int. Cl.
*H04W 56/00*        (2009.01)
*H04L 5/00*         (2006.01)
(Continued)

(52) U.S. Cl.
CPC ....... *H04W 56/0015* (2013.01); *H04L 5/0051* (2013.01); *H04W 72/0446* (2013.01); *H04W 72/25* (2023.01)

(58) Field of Classification Search
CPC ............. H04W 56/0015; H04W 72/25; H04W 72/0446; H04L 5/0051
See application file for complete search history.

(56) References Cited

U.S. PATENT DOCUMENTS

2020/0336260 A1    10/2020   Liu et al.
2021/0258896 A1*   8/2021   Zewail .................... H04L 5/005

FOREIGN PATENT DOCUMENTS

| CN | 111436062 | 7/2020 |
| CN | 114208250 | 3/2022 |

(Continued)

OTHER PUBLICATIONS

3GPP TR 38.867 V18.0.0, "3rd Generation Partnership Project; Technical Specification Group Radio Access network; Study on NR network-controlled repeaters; (Release 18)," Sep. 2022, 21 pages.

(Continued)

*Primary Examiner* — Melvin C Marcelo
(74) *Attorney, Agent, or Firm* — Fish & Richardson P.C.

(57) ABSTRACT

A method for a first node used for wireless communication and an apparatus are provided. The first node includes: a transceiver, configured to: receive one or more first type synchronization signal blocks, wherein each first type synchronization signal block in the one or more first type synchronization signal blocks includes first information; and an index of each first type synchronization signal block in the one or more first type synchronization signal blocks is one of a plurality of candidate synchronization signal block indexes; and, transmit one or more second type synchronization signal blocks, wherein each second type synchronization signal block in the one or more second type synchronization signal blocks includes the first information.

20 Claims, 5 Drawing Sheets

(51) Int. Cl.
*H04W 72/0446* (2023.01)
*H04W 72/25* (2023.01)

(56) References Cited

FOREIGN PATENT DOCUMENTS

| | | |
|---|---|---|
| CN | 114258645 | 3/2022 |
| CN | 114365556 | 4/2022 |
| CN | 114553269 | 5/2022 |
| WO | WO 2023284962 | 1/2023 |

OTHER PUBLICATIONS

International Search Report and Written Opinion in International Appln. No. PCT/CN2023/076593, mailed on Jul. 12, 2023, 13 pages (with English translation).
Samsung, "Side control information to enable NR network-controlled repeaters," 3GPP TSG RAN WG1 #109-e, R1-2203921, e-Meeting, May 9-20, 2022, 10 pages.
ZTE et al., "New WID on NR network-controlled repeaters," 3GPP TSG RAN Meeting #97-e, RP-222673, Electronic Meeting, Sep. 12-16, 2022, 5 pages.
Office Action in Chinese Appln. No. 202380008474.8, mailed on Apr. 3, 2024, 14 pages (with English translation).
Office Action in Chinese Appln. No. 202380008474.8, mailed on Jun. 27, 2024, 9 pages (with English translation).

* cited by examiner

METHOD FOR NODE USED FOR WIRELESS COMMUNICATION AND APPARATUS

CROSS-REFERENCE TO RELATED APPLICATIONS

This application is a continuation of International Application No. PCT/CN2023/076593, filed on Feb. 16, 2023, the disclosure of which is hereby incorporated by reference in its entirety.

TECHNICAL FIELD

The present application relates to the field of communications technologies, and more specifically, to a method for a node used for wireless communication and an apparatus.

BACKGROUND

In a trend of network densification and a millimeter wave (mmW) communication application, in order to improve coverage capability of a network and support rapid increase in a quantity of users, some new network nodes are gradually proposed. Such new network nodes may increase flexibility of network deployment, and thus receive increasing attention.

For example, some communications systems introduce a relay node that can amplify and forward communication signals between a user equipment (UE) and a base station. The relay node may be, for example, a network-controlled repeater (NCR).

In order to improve coverage performance of a synchronization signal block, the base station may transmit a plurality of synchronization signal blocks in a beam sweeping manner. In a general scenario where a relay node is deployed, when a base station transmits a plurality of synchronization signal blocks in a beam sweeping manner, since the relay node may be located only in coverage of some beams sent by the base station, the relay node can only forward some synchronization signal blocks. Thus, coverage of the relay node is affected, or power consumption of the relay node is increased, which is not conducive to maintaining system synchronization, beam measurement, and mobility management by a UE, and a probability of successful access of the UE to a communications system is reduced.

SUMMARY

Embodiments of the present application provide a method for a node used for wireless communication and an apparatus, to improve operation efficiency of a communication system.

According to the first aspect, a method for a node used for wireless communication is provided, including: receiving one or more first type synchronization signal blocks, where each first type synchronization signal block in the one or more first type synchronization signal blocks includes first information; and an index of each first type synchronization signal block in the one or more first type synchronization signal blocks is one of a plurality of candidate synchronization signal block indexes; and transmitting one or more second type synchronization signal blocks, where each second type synchronization signal block in the one or more second type synchronization signal blocks includes the first information; and an index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

In an implementation, an index of at least one second type synchronization signal block in the one or more second type synchronization signal blocks is different from an index of any first type synchronization signal block in the one or more first type synchronization signal blocks.

In an implementation, each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

In an implementation, the plurality of candidate synchronization signal blocks respectively include a plurality of physical broadcast channels (PBCHs), the plurality of PBCHs respectively carry a plurality of demodulation reference signals (DMRSs), and a sequence index of each DMRS in the plurality of DMRSs corresponds to at least one of the plurality of candidate synchronization signal block indexes. Each second type synchronization signal block in the one or more second type synchronization signal blocks is one of the plurality of candidate synchronization signal blocks, and a sequence index of a DMRS of a PBCH included in at least one second type synchronization signal block in the one or more second type synchronization signal blocks is different from a sequence index of a DMRS of a PBCH included in any first type synchronization signal block in the one or more first type synchronization signal blocks.

In an implementation, the plurality of candidate synchronization signal blocks respectively include a plurality of PBCHs, the plurality of PBCHs respectively carry a plurality of DMRSs, the plurality of PBCHs respectively include a plurality of pieces of first type information, and both first type information and a sequence index of a DMRS that are included in each PBCH in the plurality of PBCHs together correspond to one of the plurality of candidate synchronization signal block indexes; and first type information or a sequence index of a DMRS in a PBCH included in at least one second type synchronization signal block in the one or more second type synchronization signal blocks is different from first type information or a sequence index of a DMRS in a PBCH included in any first type synchronization signal block in the one or more first type synchronization signal blocks.

In an implementation, a time domain resource occupied by at least one second type synchronization signal block in the one or more second type synchronization signal blocks is different from a time domain resource occupied by any first type synchronization signal block in the one or more first type synchronization signal blocks.

In an implementation, the method further includes: receiving first configuration information, where the first configuration information includes a parameter of the plurality of candidate synchronization signal blocks.

In an implementation, the method further includes: receiving second configuration information, where the second configuration information is used to determine whether at least one second type synchronization signal block in the one or more second type synchronization signal blocks is different from any first type synchronization signal block in the one or more first type synchronization signal blocks, or the second configuration information is used to determine a quantity of the one or more second type synchronization signal blocks, or the second configuration information is used to determine the one or more second type synchronization signal blocks.

In an implementation, the second configuration information is configured by side control information (SCI), or the second configuration information is configured by operation administration and maintenance (OAM).

In an implementation, each first type synchronization signal block in the one or more first type synchronization signal blocks is transmitted on a first link, and each second type synchronization signal block in the one or more second type synchronization signal blocks is transmitted on a second link.

In an implementation, the method further includes: receiving first signaling, where the first signaling is transmitted on a third link, and the first signaling is used to determine the one or more first type synchronization signal blocks.

In an implementation, the first signaling includes one or more first type beam indexes, the one or more first type beam indexes respectively correspond to one or more first type beams, and the one or more first type beams are respectively used to transmit signals on the first link.

In an implementation, the first signaling includes one or more first type frequency domain resource indexes, the one or more first type frequency domain resource indexes respectively correspond to one or more first type frequency domain resources, and the one or more first type frequency domain resources are respectively used to transmit the one or more first type synchronization signal blocks.

According to a second aspect, a method for a second node used for wireless communication is provided, including: transmitting one or more first type synchronization signal blocks, where each first type synchronization signal block in the one or more first type synchronization signal blocks includes first information; and an index of each first type synchronization signal block in the one or more first type synchronization signal blocks is one of a plurality of candidate synchronization signal block indexes. The one or more first type synchronization signal blocks are used to trigger a first node to transmit one or more second type synchronization signal blocks, and each second type synchronization signal block in the one or more second type synchronization signal blocks includes the first information. An index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

In an implementation, an index of at least one second type synchronization signal block in the one or more second type synchronization signal blocks is different from an index of any first type synchronization signal block in the one or more first type synchronization signal blocks.

In an implementation, each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

In an implementation, the plurality of candidate synchronization signal blocks respectively include a plurality of PBCHs, the plurality of PBCHs respectively carry a plurality of DMRSs, and a sequence index of each DMRS in the plurality of DMRSs corresponds to at least one of the plurality of candidate synchronization signal block indexes. Each second type synchronization signal block in the one or more second type synchronization signal blocks is one of the plurality of candidate synchronization signal blocks, and a sequence index of a DMRS of a PBCH included in at least one second type synchronization signal block in the one or more second type synchronization signal blocks is different from a sequence index of a DMRS of a PBCH included in any first type synchronization signal block in the one or more first type synchronization signal blocks.

In an implementation, the plurality of candidate synchronization signal blocks respectively include a plurality of PBCHs, the plurality of PBCHs respectively carry a plurality of DMRSs, the plurality of PBCHs respectively include a plurality of pieces of first type information, and both first type information and a sequence index of a DMRS that are included in each PBCH in the plurality of PBCHs together correspond to one of the plurality of candidate synchronization signal block indexes; and first type information or a sequence index of a DMRS in a PBCH included in at least one second type synchronization signal block in the one or more second type synchronization signal blocks is different from first type information or a sequence index of a DMRS in a PBCH included in any first type synchronization signal block in the one or more first type synchronization signal blocks.

In an implementation, a time domain resource occupied by at least one second type synchronization signal block in the one or more second type synchronization signal blocks is different from a time domain resource occupied by any first type synchronization signal block in the one or more first type synchronization signal blocks.

In an implementation, the method further includes: transmiting first configuration information, where the first configuration information includes a parameter of the plurality of candidate synchronization signal blocks.

In an implementation, the method further includes: transmitting second configuration information, where the second configuration information is used to determine whether at least one second type synchronization signal block in the one or more second type synchronization signal blocks is different from any first type synchronization signal block in the one or more first type synchronization signal blocks, or the second configuration information is used to determine a quantity of the one or more second type synchronization signal blocks.

In an implementation, the second configuration information is configured by SCI, or the second configuration information is configured by OAM.

In an implementation, each first type synchronization signal block in the one or more first type synchronization signal blocks is transmitted on a first link, and each second type synchronization signal block in the one or more second type synchronization signal blocks is transmitted on a second link.

In an implementation, the method further includes: transmitting first signaling, where the first signaling is transmitted on a third link, and the first signaling is used to determine the one or more first type synchronization signal blocks.

In an implementation, the first signaling includes one or more first type beam indexes, the one or more first type beam indexes respectively correspond to one or more first type beams, and the one or more first type beams are respectively used to transmit signals on the first link.

In an implementation, the first signaling includes one or more first type frequency domain resource indexs, the one or more first type frequency domain resource indexs respectively correspond to one or more first type frequency domain resources, and the one or more first type frequency domain resources are respectively used to transmit the one or more first type synchronization signal blocks.

According to a third aspect, a node used for wireless communication is provided, the node is a first node, and the first node includes: a first receiving module, configured to receive one or more first type synchronization signal blocks, where each first type synchronization signal block in the one or more first type synchronization signal blocks includes first information; and an index of each first type synchronization signal block in the one or more first type synchronization signal blocks is one of a plurality of candidate synchronization signal block indexes; and a first transmitting module, configured to transmit one or more second type synchronization signal blocks, where each second type synchronization signal block in the one or more second type synchronization signal blocks includes the first information; and an index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

In an implementation, an index of at least one second type synchronization signal block in the one or more second type synchronization signal blocks is different from an index of any first type synchronization signal block in the one or more first type synchronization signal blocks.

In an implementation, each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

In an implementation, the plurality of candidate synchronization signal blocks respectively include a plurality of PBCHs, the plurality of PBCHs respectively carry a plurality of DMRSs, and a sequence index of each DMRS in the plurality of DMRSs corresponds to at least one of the plurality of candidate synchronization signal block indexes. Each second type synchronization signal block in the one or more second type synchronization signal blocks is one of the plurality of candidate synchronization signal blocks, and a sequence index of a DMRS of a PBCH included in at least one second type synchronization signal block in the one or more second type synchronization signal blocks is different from a sequence index of a DMRS of a PBCH included in each first type synchronization signal block in the one or more first type synchronization signal blocks.

In an implementation, the plurality of candidate synchronization signal blocks respectively include a plurality of PBCHs, the plurality of PBCHs respectively carry a plurality of DMRSs, the plurality of PBCHs respectively include a plurality of pieces of first type information, and both first type information and a sequence index of a DMRS that are included in each PBCH in the plurality of PBCHs together correspond to one of the plurality of candidate synchronization signal block indexes; and first type information or a sequence index of a DMRS in a PBCH included in at least one second type synchronization signal block in the one or more second type synchronization signal blocks is different from first type information or a sequence index of a DMRS in a PBCH included in any first type synchronization signal block in the one or more first type synchronization signal blocks.

In an implementation, a time domain resource occupied by at least one second type synchronization signal block in the one or more second type synchronization signal blocks is different from a time domain resource occupied by any first type synchronization signal block in the one or more first type synchronization signal blocks.

In an implementation, the first node further includes: a second receiving module, configured to receive first configuration information, where the first configuration information includes a parameter of the plurality of candidate synchronization signal blocks.

In an implementation, the first node further includes: a third receiving module, configured to receive second configuration information, the second configuration information is used to determine whether at least one second type synchronization signal block in the one or more second type synchronization signal blocks is different from any first type synchronization signal block in the one or more first type synchronization signal blocks, or the second configuration information is used to determine a quantity of the one or more second type synchronization signal blocks.

In an implementation, the second configuration information is configured by SCI, or the second configuration information is configured by OAM.

In an implementation, each first type synchronization signal block in the one or more first type synchronization signal blocks is transmitted on a first link, and each second type synchronization signal block in the one or more second type synchronization signal blocks is transmitted on a second link.

In an implementation, the first node includes: a fourth receiving module, configured to receive first signaling. The first signaling is transmitted on a third link, and the first signaling is used to determine the one or more first type synchronization signal blocks.

In an implementation, the first signaling includes one or more first type beam indexs, the one or more first type beam indexs respectively correspond to one or more first type beams, and the one or more first type beams are respectively used to transmit signals on the first link.

In an implementation, the first signaling includes one or more first type frequency domain resource indexs, the one or more first type frequency domain resource indexs respectively correspond to one or more first type frequency domain resources, and the one or more first type frequency domain resources are respectively used to transmit the one or more first type synchronization signal blocks.

According to a fourth aspect, a node used for wireless communication is provided, the node is a second node, and the second node includes: a first transmitting module, configured to transmit one or more first type synchronization signal blocks, where each first type synchronization signal block in the one or more first type synchronization signal blocks includes first information; and an index of each first type synchronization signal block in the one or more first type synchronization signal blocks is one of a plurality of candidate synchronization signal block indexes; and the one or more first type synchronization signal blocks are used to trigger a first node to transmit one or more second type synchronization signal blocks, each second type synchronization signal block in the one or more second type synchronization signal blocks includes the first information; and an index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

In an implementation, an index of at least one second type synchronization signal block in the one or more second type synchronization signal blocks is different from an index of any first type synchronization signal block in the one or more first type synchronization signal blocks.

In an implementation, each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

In an implementation, the plurality of candidate synchronization signal blocks respectively include a plurality of PBCHs, the plurality of PBCHs respectively carry a plurality of DMRSs, and a sequence index of each DMRS in the plurality of DMRSs corresponds to at least one of the plurality of candidate synchronization signal block indexes. Each second type synchronization signal block in the one or more second type synchronization signal blocks is one of the plurality of candidate synchronization signal blocks, and a sequence index of a DMRS of a PBCH included in at least one second type synchronization signal block in the one or more second type synchronization signal blocks is different from a sequence index of a DMRS of a PBCH included in any first type synchronization signal block in the one or more first type synchronization signal blocks.

In an implementation, the plurality of candidate synchronization signal blocks respectively include a plurality of PBCHs, the plurality of PBCHs respectively carry a plurality of DMRSs, the plurality of PBCHs respectively include a plurality of pieces of first type information, and both first type information and a sequence index of a DMRS that are included in each PBCH in the plurality of PBCHs together correspond to one of the plurality of candidate synchronization signal block indexes; and first type information or a sequence index of a DMRS in a PBCH included in at least one second type synchronization signal block in the one or more second type synchronization signal blocks is different from first type information or a sequence index of a DMRS in a PBCH included in any first type synchronization signal block in the one or more first type synchronization signal blocks.

In an implementation, a time domain resource occupied by at least one second type synchronization signal block in the one or more second type synchronization signal blocks is different from a time domain resource occupied by any first type synchronization signal block in the one or more first type synchronization signal blocks.

In an implementation, the second node further includes: a second transmitting module, configured to transmit first configuration information, where the first configuration information includes a parameter of the plurality of candidate synchronization signal blocks.

In an implementation, the second node further includes a third transmitting module, configured to transmit second configuration information, where the second configuration information is used to determine whether at least one second type synchronization signal block in the one or more second type synchronization signal blocks is different from any first type synchronization signal block in the one or more first type synchronization signal blocks, or the second configuration information is used to determine a quantity of the one or more second type synchronization signal blocks.

In an implementation, the second configuration information is configured by SCI, or the second configuration information is configured by OAM.

In an implementation, each first type synchronization signal block in the one or more first type synchronization signal blocks is transmitted on a first link, and each second type synchronization signal block in the one or more second type synchronization signal blocks is transmitted on a second link.

In an implementation, the second node includes: a fourth transmitting module, configured to transmit first signaling. The first signaling is transmitted on a third link, and the first signaling is used to determine the one or more first type synchronization signal blocks.

In an implementation, the first signaling includes one or more first type beam indexes, the one or more first type beam indexes respectively correspond to one or more first type beams, and the one or more first type beams are respectively used to transmit signals on the first link.

In an implementation, the first signaling includes one or more first type frequency domain resource indexes, the one or more first type frequency domain resource indexes respectively correspond to one or more first type frequency domain resources, and the one or more first type frequency domain resources are respectively used to transmit the one or more first type synchronization signal blocks.

According to a fifth aspect, a node used for wireless communications is provided, including a transceiver, a memory, and a processor, where the memory is configured to store a program, and the processor is configured to call the program in the memory, and control the transceiver to receive or transmit a signal, to cause the node to perform the method according to each implementation of the first aspect or the second aspect.

According to a sixth aspect, an apparatus is provided, including a processor configured to call a program from a memory, to cause the apparatus to perform the method according to each implementation of the first aspect or the second aspect.

According to a seventh aspect, a chip is provided, including a processor configured to call a program from a memory, to cause a device installed with the chip to perform the method according to each implementation of the first aspect or the second aspect.

According to an eighth aspect, a computer-readable storage medium is provided, and the computer-readable storage medium stores a program that causes a computer to perform the method according to each implementation of the first aspect or the second aspect.

According to a ninth aspect, a computer program product is provided, including a program that causes a computer to perform the method according to each implementation of the first aspect or the second aspect.

According to a tenth aspect, a computer program is provided, where the computer program causes a computer to perform the method according to each implementation of the first aspect or the second aspect.

In the embodiments of the present application, a first node serving as a relay does not simply forward one or more received first type synchronization signal blocks, but forwards one or more second type synchronization signal blocks different from the one or more first type synchronization signal blocks.

DETAILED DESCRIPTION OF THE EMBODIMENTS

Communications System Architecture

Figure 1:
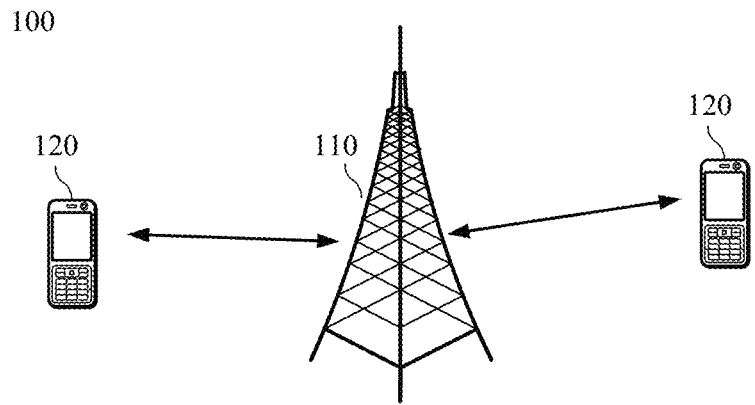
FIG. 1 is an example diagram of a system architecture of a wireless communications system to which an embodiment of the present application is applicable.

FIG. 1 is an example diagram of a system architecture of a wireless communications system 100 to which an embodiment of the present application is applicable. The wireless communications system 100 may include a network device 110 and a UE 120. The network device 110 may be a device in communication with the UE 120. The network device 110 may provide communication coverage for a specific geographic area, and may communicate with a UE 120 located within the coverage.

FIG. 1 shows an example in which there is one network device and one UE. Optionally, the wireless communications system 100 may include one or more network devices 110, and/or one or more UEs 120. For a network device 110, the one or more UEs 120 may be located within the network coverage of the network device 110, may be located outside the network coverage of the network device 110, or may be located partially within the network coverage of the network device 110, and may be located partially outside the network coverage of the network device 110, which is not limited in the embodiments of the present application.

Optionally, the wireless communications system 100 may further include other network entities such as a network controller and a mobility management entity, which is not limited in the embodiments of the present application.

It should be understood that the technical solutions in the embodiments of the present application may be applied to various communications systems, for example, a 5th generation (5G) system or new radio (NR) system, a long term evolution (LTE) system, an LTE frequency division duplex (FDD) system, and an LTE time division duplex (TDD). The technical solutions provided in the present application may also be applied to future communications systems, such as a 6th generation mobile communications system and a satellite communications system.

The UE in the embodiments of the present application may also be referred to as a terminal device, an access terminal, a subscriber unit, a subscriber station, a mobile, a mobile station (MS), a mobile terminal (MT), a remote station, a remote terminal device, a mobile device, a user terminal, a terminal, a wireless communications device, a user agent, or a user apparatus. The UE in the embodiments of the present application may be a device providing a user with voice and/or data connectivity and capable of connecting people, objects, and machines, such as a handheld device or vehicle-mounted device having a wireless connection function. The UE in the embodiments of the present application may be a mobile phone, a tablet computer (Pad), a notebook computer, a palmtop computer, a mobile internet device (MID), a wearable device, a vehicle, a wireless terminal in industrial control, a wireless terminal in self driving, a wireless terminal in remote medical surgery, a wireless terminal in a smart grid, a wireless terminal in transportation safety, a wireless terminal in smart city, a wireless terminal in smart home, or the like. For example, the UE may act as a scheduling entity, which provides a sidelink signal between UEs in vehicles to-everything (V2X), device-to-device (D2D), or the like. For example, a cellular phone and a vehicle communicate with each other by using a sidelink signal. A cellular phone and a smart home device communicate with each other, without the relay of a communication signal through a base station. Optionally, the UE may be used to act as a base station.

The network device in the embodiments of the present application may be a device for communicating with the UE. The network device may also be referred to as an access network device or a wireless access network device. For example, the network device may be a base station. The network device in the embodiments of the present application may be a radio access network (RAN) node (or device) that connects the UE to a wireless network. The base station may broadly cover various names in the following, or may be interchangeable with the following names, for example, a NodeB, an evolved NodeB (eNB), a next generation NodeB (gNB), a relay station, an access point, a transmitting and receiving point (TRP), a transmitting point (TP), a master MeNB, a secondary SeNB, a multi-standard radio (MSR) node, a home base station, a network controller, an access node, a radio node, an access point (AP), a transmission node, a transceiver node, a base band unit (BBU), a remote radio unit (RRU), an active antenna unit (AAU), a remote radio head (RRH), a central unit (CU), a distributed unit (DU), and a positioning node. The base station may be a macro base station, a micro base station, a relay node, a donor node, or the like, or a combination thereof. Alternatively, the base station may be a communications module, a modem, or a chip disposed in the device or apparatus described above. Alternatively, the base station may be a mobile switching center, a device that assumes the function of a base station in D2D, V2X, and machine-to-machine (M2M) communications, a network-side device in a 6G network, a device that assumes the function of a base station in a future communications system, or the like. The base station may support networks of the same or different access technologies. A specific technology and specific device form used by the network device are not limited in the embodiments of the present application.

The base station may be fixed or mobile. For example, a helicopter or drone may be configured to act as a mobile base station, and one or more cells may move according to the position of the mobile base station. In other examples, a helicopter or drone may be configured to serve as a device in communication with another base station.

In some deployments, the network device in the embodiments of the present application may be a CU or a DU, or the network device includes a CU and a DU. The gNB may further include an AAU.

The network device and the UE may be deployed on land, including indoor or outdoor, handheld or vehicle-mounted; or may be deployed on water; or may be deployed on an airplane, a balloon, and a satellite in the air. In the embodiments of the present application, a scenario where the network device and the UE are located is not limited.

New Network Node in Communications System

In the trend of application of network densification and millimeter wave communication, some new network nodes are gradually proposed in order to improve coverage capability of a network and to support user quantity growing at a high speed. Such new network nodes may increase flexibility of network deployment, and thus receive increasing attention.

For example, the NR Release-16 (Rel-16) version introduces an integrated access and backhaul (IAB) node. The IAB node is further enhanced in the NR Release-17 (Rel-17) version. The major feature of the IAB node is that no wired backhaul link needs to be disposed between network nodes.

For another example, a wireless repeater widely used in 2G, 3G, and 4G systems also belongs to a new network node other than a base station. The wireless repeater may also be referred to as a radio frequency repeater (RF repeater) or a relay. A conventional wireless repeater is simply used to amplify and forward received signals. Although such type of wireless repeater has a simple function and high cost-effectiveness, it cannot be flexibly adjusted according to an actual condition of a communications system, and therefore, performance is poor. Some communications systems introduce an NCR compared to the conventional wireless repeater. The NCR increases the ability to receive side control information (SCI) from a network device and process the SCI. Based on the SCI, the NCR can efficiently perform amplification and forwarding functions of a signal, and reduce unnecessary noise amplification, thereby providing better spatial directivity for reception and transmission of the NCR. The NR Release-18 (Rel-18) version carries out a study item (SI) of the NCR. In September 2022, 3GPP passed RP-222673 and started the "NR NCR" work item (WI) in NR Rel-18, thereby formalizing standardization of NCR in the NR system.

Figure 2:
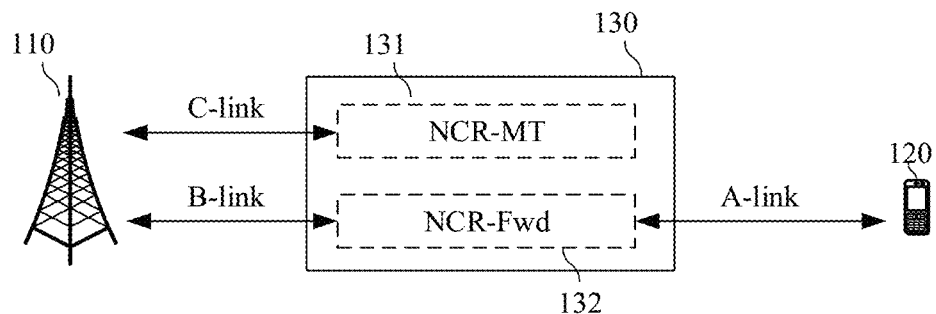
FIG. 2 is a schematic structural diagram of an NCR.

According to the study report (3GPP TR38.867) of the NCR, as shown in FIG. 2, an NCR 130 mainly includes two functional modules: an NCR-mobile termination (NCR-MT) 131 and an NCR-forwarding (NCR-Fwd) 132. The NCR-MT 131 may be responsible for interacting with a base station 110 via a control link (C-link). The NCR-Fwd 132 is mainly responsible for amplifying and forwarding uplink (UL)/downlink (DL) radio frequency signals between the base station 110 and a UE 120 via backhaul link (B-link) and access link (A-link). The behavior of the NCR-Fwd 132 is controlled by SCI from the base station 110. The SCI may include one or more of the following information: beam information, timing information, uplink-downlink time division duplex configuration (UL-DL TDD configuration) information, on-off information of NCR-Fwd, and power control information of NCR-Fwd.

In a communications system, a base station may periodically broadcast a synchronization signal block; accordingly, a UE may receive a synchronization signal block broadcast by the base station, so as to access the communications system based on the received synchronization signal block. It should be noted that the synchronization signal block mentioned in the embodiments of the present application may be, for example, a synchronization signal/physical broadcast channel block (SS/PBCH block, SSB). Sometimes the SSB may also be referred to as a synchronization broadcast signal.

In some scenarios, the UE does not directly receive a synchronization signal block sent by the base station, but receives a synchronization signal block forwarded by a relay node. For example, if an NCR (see FIG. 2) is deployed in a communications system, the NCR may receive a synchronization signal block sent by a base station and forward the synchronization signal block to a UE within coverage of the NCR.

To increase coverage of the synchronization signal block, the base station may transmit a plurality of synchronization signal blocks in a beam sweeping manner. However, since the relay node may be located within coverage of some beams of the base station, the relay node generally forwards only synchronization signal blocks corresponding to these beams, thereby possibly reducing a probability of successful access of the UE to the communications system.

Figure 3:
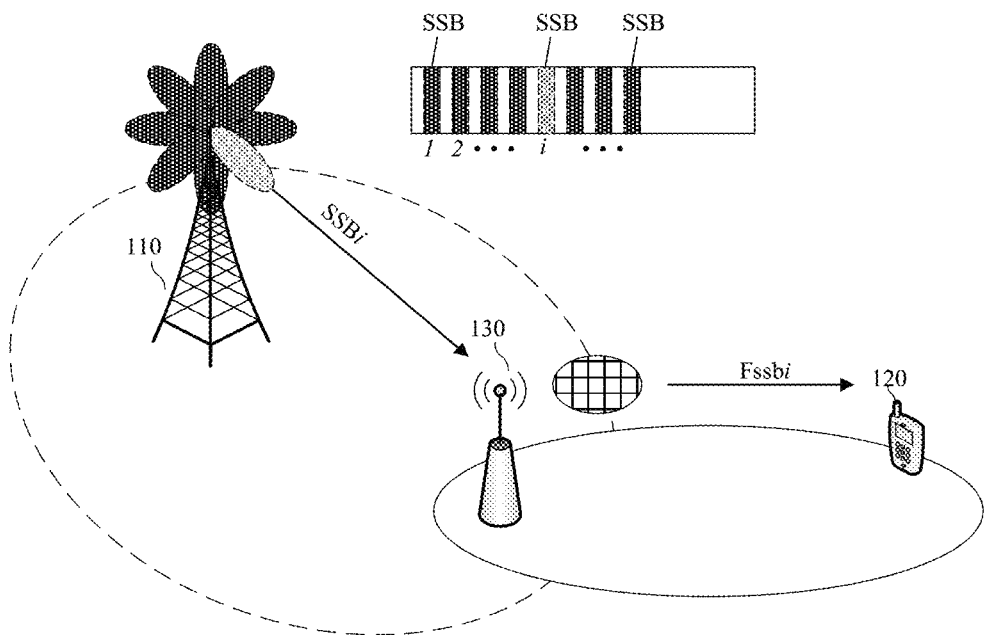
FIG. 3 is an example diagram of a possible signal forwarding mode of an NCR.
Figure 4:
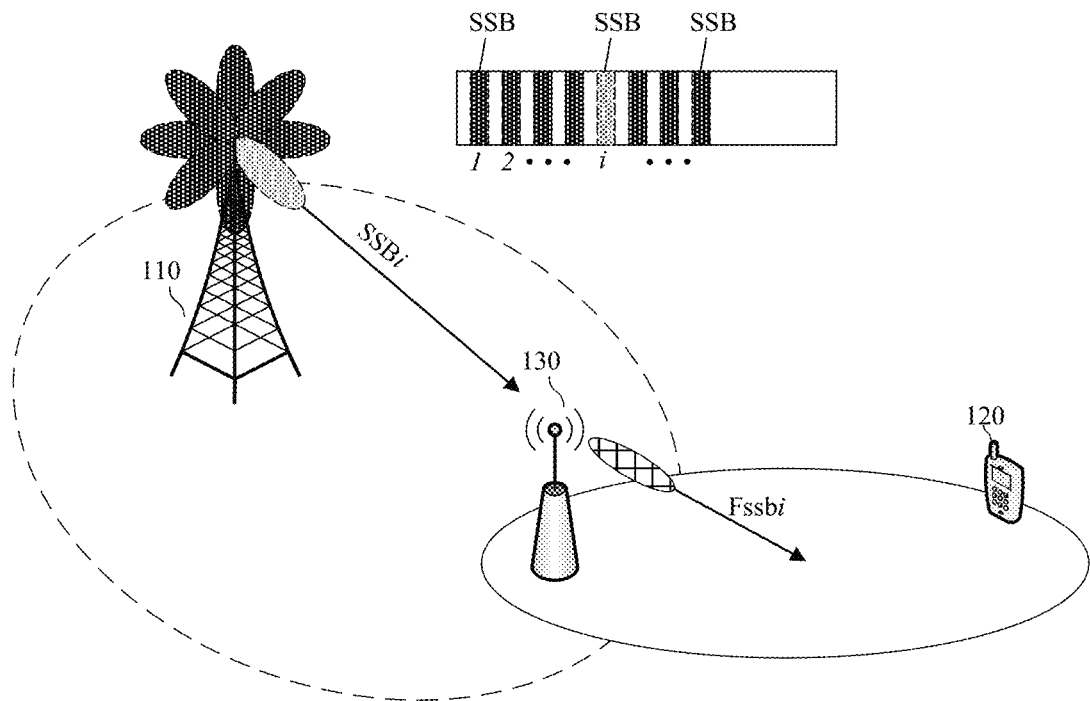
FIG. 4 is an example diagram of another possible signal forwarding mode of an NCR.

Still an NCR deployment scenario is used as an example. Referring to FIG. 3 and FIG. 4, since capabilities of a base station 110 and an NCR 130 are different, downlink transmission beams (DL Tx beams) of the base station 110 and downlink transmission beams of an NCR-Fwd (an internal structure of the NCR is not shown in FIG. 3 or FIG. 4, and for related description of the NCR-Fwd, reference may be made to FIG. 2) may be completely different physical beams. When the UE 120 accesses a network through the NCR 130, the UE 120 first needs to receive a synchronization signal block from the base station 110 through the NCR 130. To increase coverage capability of the synchronization signal block, the base station 110 may transmit a plurality of synchronization signal blocks on B-link in a beam sweeping manner. Assuming that NCR-Fwd in the NCR 130 is within coverage of one beam of B-link, the NCR-Fwd can receive only one synchronization signal block (SSBi shown in FIG. 3). After receiving the synchronization signal block, the NCR-Fwd may forward the synchronization signal block in the two manners as follows.

Manner 1: As shown in FIG. 3, the NCR-Fwd may forward a synchronization signal block (namely, Fssbi in FIG. 3) from the base station 110 on A-link by using a wide beam. In this manner, coverage of the synchronization signal block may be increased, but signal quality of the Fssbi received by the UE 120 is poor due to using of the wide wave.

Manner 2: As shown in FIG. 4, the NCR-Fwd may forward a synchronization signal block (namely, Fssbi in FIG. 4) from the base station 110 on A-link by using a narrow beam corresponding to the Fssbi. The beamforming gain of the narrow beam is large, so that signal reception quality may be improved. However, since coverage of the narrow beam is small, the UE 120 may not be in the coverage of the narrow beam, so that the UE 120 cannot receive the Fssbi forwarded by the NCR-Fwd.

In view of the foregoing problems, after receiving one or more synchronization signal blocks, a node having a relay function provided in the embodiments of the present application does not simply forward the one or more synchronization signal blocks, but transmits one or more synchronization signal blocks (hereinafter referred to as second type synchronization signal blocks) different from the one or more synchronization signal blocks (hereinafter referred to as first type synchronization signal blocks), so that one or more of the following objectives may be achieved: improving signal reception quality, reducing signaling overheads, and improving resource utilization efficiency and a probability of successful access of a UE to a communications system.

The methods and apparatus provided in the present application are illustrated by using a plurality of embodiments or examples. The different features in these embodiments or examples may be combined with each other without being inconsistent with each other, so as to obtain new embodiments or examples, and these new embodiments or examples also fall within the protection scope of the present application.

Figure 5:
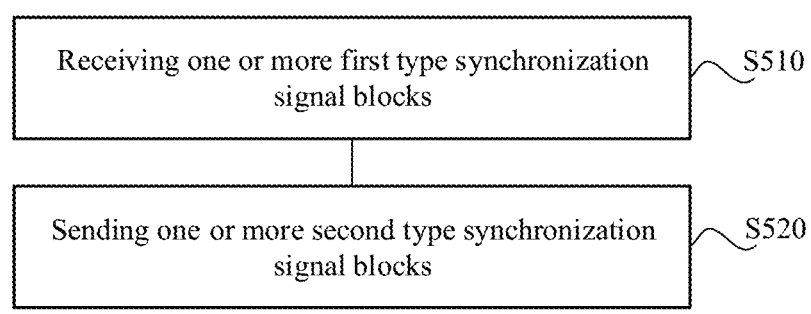
FIG. 5 is a schematic flowchart of a method for a first node used for wireless communication according to an embodiment of the present application.

FIG. 5 is a method 500 for a first node used for wireless communication according to an embodiment of the present application. The first node may be each type of node having a relay or synchronization signal block forwarding function in a communications system.

In an embodiment, the first node may be an NCR.

In an embodiment, the first node device may be a wireless repeater.

In an embodiment, the first node may be a relay.

In an embodiment, the first node may be a UE, that is, the UE may be used as a relay node for forwarding a synchronization signal block.

Referring to FIG. 5, in Step S510 and Step S520, one or more first type synchronization signal blocks are received; and one or more second type synchronization signal blocks are sent.

In an embodiment, the one or more first type synchronization signal blocks may include only one first type synchronization signal block.

In an embodiment, the one or more first type synchronization signal blocks may include a plurality of first type synchronization signal blocks.

In an embodiment, each synchronization signal block in the one or more first type synchronization signal blocks is an SSB.

In an embodiment, the one or more first type synchronization signal blocks are used to determine or reconstruct the one or more second type synchronization signal blocks.

In an embodiment, the one or more first type synchronization signal blocks are used to determine an index of each second type synchronization signal block in the one or more second type synchronization signal blocks.

In an embodiment, the one or more first type synchronization signal blocks are used to determine an index of each second type synchronization signal block in the one or more second type synchronization signal blocks from a plurality of candidate synchronization signal block indexes.

In an embodiment, the one or more first type synchronization signal blocks are used to determine a DMRS of a PBCH included in each second type synchronization signal block in the one or more second type synchronization signal blocks.

In an embodiment, the one or more first type synchronization signal blocks are used to determine first type information (such as a payload of a PBCH) in a PBCH included in each second type synchronization signal block in the one or more second type synchronization signal blocks.

In an embodiment, the one or more first type synchronization signal blocks are used to access a base station.

In an embodiment, the one or more second type synchronization signal blocks include only one second type synchronization signal block.

In an embodiment, the one or more second type synchronization signal blocks include a plurality of second type synchronization signal blocks.

In an embodiment, each synchronization signal block in the one or more second type synchronization signal blocks is an SSB.

In an embodiment, the one or more second type synchronization signal blocks are used to access a base station.

In an embodiment, if the first node transmits a plurality of second type synchronization signal blocks, the plurality of second type synchronization signal blocks respectively correspond to a plurality of beams.

In an embodiment, if the first node transmits a plurality of second type synchronization signal blocks, the plurality of second type synchronization signal blocks respectively correspond to a plurality of spatial filters.

In an embodiment, if the first node transmits a plurality of second type synchronization signal blocks, the plurality of second type synchronization signal blocks respectively correspond to a plurality of antenna ports.

In an embodiment, if the first node transmits a plurality of second type synchronization signal blocks, the plurality of second type synchronization signal blocks may be transmitted in a beam sweeping manner.

In an embodiment, the one or more second type synchronization signal blocks may belong to a subset of the one or more first type synchronization signal blocks.

In an embodiment, the one or more second type synchronization signal blocks may belong to a true subset of the one or more first type synchronization signal blocks.

In an embodiment, the one or more second type synchronization signal blocks may be determined based on configuration information (such as time domain resource configuration information) of a synchronization signal block stored in advance by the first node.

Each first type synchronization signal block in the one or more first type synchronization signal blocks may include first information.

In an embodiment, the first information is used to generate the one or more second type synchronization signal blocks.

In an embodiment, the first information includes system information. For example, the first information may refer to MIB information. In other words, the one or more first type synchronization signal blocks may include same MIB information.

In an embodiment, each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

Definitions for the first period are not specifically limited in the embodiments of the present application.

In an embodiment, the first period may include a positive integer number of half-frames.

In an embodiment, the first period may be a half-frame.

In an embodiment, the first period may be equal to 0.5 ms.

In an embodiment, the first period may include a positive integer number of frames.

Each first type synchronization signal block in the one or more first type synchronization signal blocks is transmitted on a first link, and each second type synchronization signal block in the one or more second type synchronization signal blocks is transmitted on a second link.

In an embodiment, the first link may be a backhaul link.

In an embodiment, the second link is an access link.

In an embodiment, the first link is a link between an NCR-Fwd and a base station.

In an embodiment, the second link is a link between an NCR-Fwd and a UE.

In an embodiment, an NCR-Fwd communicates with a base station through the first link.

In an embodiment, an NCR-Fwd communicates with a UE through the second link.

In an embodiment, the first link is DL and the second link is DL.

In an embodiment, the first link is DL and the second link is sidelink (SL).

Each first type synchronization signal block in the one or more first type synchronization signal blocks mentioned above may include first information (such as MIB information). Correspondingly, each second type synchronization signal block in the one or more second type synchronization signal blocks may also include the first information. In other words, the one or more first type synchronization signal blocks and the one or more second type synchronization signal blocks may include same system information (such as MIB information).

An index of each second type synchronization signal block in the one or more second type synchronization signal blocks is one of a plurality of candidate synchronization signal block indexes. The plurality of candidate synchronization signal block indexes may be indexes of a plurality of candidate synchronization signal blocks within one period (hereinafter referred to as a first period).

In an embodiment, the first period may include a positive integer number of half-frames.

In an embodiment, the first period may be a half-frame.

In an embodiment, the first period may be equal to 0.5 ms.

In an embodiment, the first period may include a positive integer number of frames.

At least one second type synchronization signal block in the one or more second type synchronization signal blocks is different from any first type synchronization signal block in the one or more first type synchronization signal blocks. There may be a plurality of definitions for that at least one second type synchronization signal block in the one or more second type synchronization signal blocks is different from any first type synchronization signal block in the one or more first type synchronization signal blocks, and several possible defining manners are provided below.

In the embodiments of the present application, a first node serving as a relay does not simply forward one or more received first type synchronization signal blocks, but forwards one or more second type synchronization signal blocks different from the one or more first type synchronization signal blocks, thereby improving operation efficiency of a communications system.

The methods for a node used for wireless communication provided in the embodiments of the present application help improve coverage of a relay node.

The methods for a node used for wireless communication provided in the embodiments of the present application help reduce power consumption of a relay node.

The methods for a node used for wireless communication provided in the embodiments of the present application help a UE to maintain system synchronization, beam measurement, and mobility management.

The methods for a node used for wireless communication provided in the embodiments of the present application help improve a probability of successful access of a UE to a communications system.

Definition 1

An index of at least one second type synchronization signal block in the one or more second type synchronization signal blocks is different from an index of any first type synchronization signal block in the one or more first type synchronization signal blocks.

Definition 2

The plurality of candidate synchronization signal blocks respectively include a plurality of PBCHs. The plurality of PBCHs respectively carry a plurality of DMRSs, and a sequence index of each DMRS in the plurality of DMRSs corresponds to at least one of the plurality of candidate synchronization signal block indexes (for example, a plurality of sequence indexes of the plurality of DMRSs are in a one-to-one correspondence with the plurality of candidate synchronization signal block indexes). Each second type synchronization signal block in the one or more second type synchronization signal blocks is one of a plurality of candidate synchronization signal block indexes. A sequence index of a DMRS in a PBCH included in at least one second type synchronization signal block in the one or more second type synchronization signal blocks is different from a sequence index of a DMRS in a PBCH included in any first type synchronization signal block in the one or more first type synchronization signal blocks.

For example, when a quantity of the plurality of candidate synchronization signal block indexes is not greater than 8, the plurality of sequence indexes of the plurality of DMRSs are in a one-to-one correspondence with the plurality of candidate synchronization signal block indexes.

Definition 3

The plurality of candidate synchronization signal blocks respectively include a plurality of PBCHs. The plurality of PBCHs respectively carry a plurality of DMRSs, and the plurality of PBCHs respectively include a plurality of pieces of first type information. The first type information may include, for example, a payload of a PBCH.

First type information and a sequence index of a DMRS that are included in each PBCH in the plurality of PBCHs together correspond to one of the plurality of candidate synchronization signal block indexes. For example, a most significant bit (MSB) of synchronization signal block indexes may be determined based on a plurality of pieces of first type information included in the plurality of PBCHs, and a least significant bit (LSB) of synchronization signal block indexes may be determined based on DMRS sequences of the plurality of PBCHs. The MSB and the LSB are combined to correspond to an index in a plurality of candidate synchronization signal blocks.

Further, first type information in a PBCH included in at least one second type synchronization signal block in the one or more second type synchronization signal blocks is different from first type information in a PBCH included in any first type synchronization signal block in the one or more first type synchronization signal blocks.

Alternatively, a sequence index of a DMRS in a PBCH included in at least one second type synchronization signal block in the one or more second type synchronization signal blocks is different from a sequence index of a DMRS in a PBCH included in any first type synchronization signal block in the one or more first type synchronization signal blocks.

In an embodiment, when a quantity of the plurality of candidate synchronization signal block indexes is greater than 8, both the first type information and sequence indexes of a DMRS that are in the plurality of PBCHs are in a one-to-one correspondence with the plurality of candidate synchronization signal block indexes, respectively.

Definition 4

A time domain resource occupied by at least one second type synchronization signal block in the one or more second type synchronization signal blocks is different from a time domain resource occupied by each first type synchronization signal block in the one or more first type synchronization signal blocks.

In an embodiment, the time domain resource occupied by at least one second type synchronization signal block in the one or more second type synchronization signal blocks includes a slot.

In an embodiment, the time domain resource occupied by at least one second type synchronization signal block in the one or more second type synchronization signal blocks includes one or more multicarrier symbols in a slot.

In an embodiment, the plurality of candidate synchronization signal blocks respectively correspond to a plurality of time-frequency resources.

In an embodiment, the plurality of time-frequency resources are in a one-to-one correspondence with the plurality of candidate synchronization signal block indexes.

In an embodiment, a time-frequency domain resource occupied by at least one second type synchronization signal block in the one or more second type synchronization signal blocks is different from a time-frequency domain resource occupied by any first type synchronization signal block in the one or more first type synchronization signal blocks.

Figure 6:
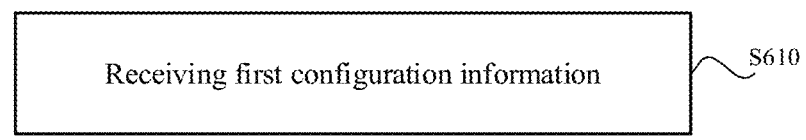
FIG. 6 is a schematic flowchart of a method for a first node used for wireless communication according to another embodiment of the present application.

Referring to FIG. 6, a method 600 for a first node used for wireless communication according to an embodiment of the present application may further include Step S610 of receiving first configuration information. The first configuration information includes a parameter of the plurality of candidate synchronization signal blocks.

In an embodiment, the first configuration information may include parameters indicating a transmission period and/or resource configuration of the plurality of candidate synchronization signal blocks.

In an embodiment, the first configuration information may indicate one or more following information of the plurality of candidate synchronization signal blocks: resource configuration information, a carried DMRS, a slot index, and a half-frame index.

In an embodiment, the first configuration information includes a radio resource control information element (RRC IE).

In an embodiment, the first configuration information includes SCI.

In an embodiment, the first configuration information includes ServingCellConfigCommon.

In an embodiment, the first configuration information is acquired by the first node upon initial access to a communication system.

In an embodiment, the first configuration information is transmitted on a third link.

In an embodiment, the third link is a control link.

In an embodiment, the third link is a link between an NCR-MT and a base station.

In an embodiment, an NCR-MT communicates with a base station through the third link.

Figure 7:
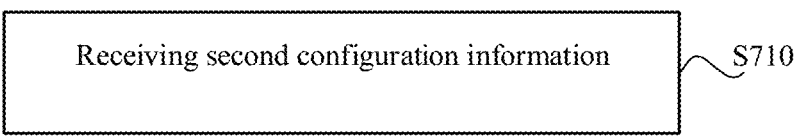
FIG. 7 is a schematic flowchart of a method for a first node used for wireless communication according to still another embodiment of the present application.

Referring to FIG. 7, a method 700 for a first node used for wireless communication according to an embodiment of the present application may further include Step S710 of receiving second configuration information.

The second configuration information may be used to determine whether at least one second type synchronization signal block in the one or more second type synchronization signal blocks is different from any first type synchronization signal block in the one or more first type synchronization signal blocks.

In an embodiment, the second configuration information includes an enable/disable indication. If the second configuration information includes an enable indication, the first node transmits the one or more second type synchronization signal blocks, and at least one second type synchronization signal block in the one or more second type synchronization signal blocks is different from any first type synchronization signal block in the one or more first type synchronization signal blocks. If the second configuration information includes a disable indication, the first node does not transmit the one or more second type synchronization signal blocks, but directly forwards the one or more first type synchronization signal blocks.

In an embodiment, the second configuration information may be used to determine a quantity of the one or more second type synchronization signal blocks.

In an embodiment, the quantity of the one or more second type synchronization signal blocks may be determined based on a channel condition or a physical environment between the first node and the second node, and the quantity of the one or more second type synchronization signal blocks may be configured by using the second configuration information.

In an embodiment, the second configuration information is used to determine the one or more second type synchronization signal blocks.

In an embodiment, the second configuration information is used to determine a time domain resource occupied by a second type synchronization signal block.

In an embodiment, the second configuration information is used to determine a DMRS of a PBCH included in a second type synchronization signal block.

In an embodiment, the second configuration information is used to determine first type information (such as a payload of a PBCH) of a PBCH included in a second type synchronization signal block.

In an embodiment, the second configuration information is configured by SCI.

In an embodiment, the second configuration information is configured by OAM.

The second configuration information is introduced, so that a transmission mode of a synchronization signal may be flexibly adjusted according to an actual condition.

Figure 8:
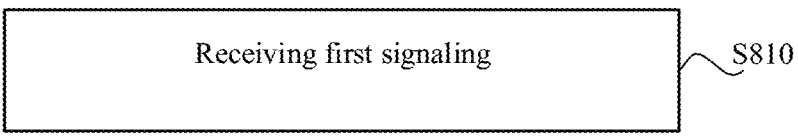
FIG. 8 is a schematic flowchart of a method for a first node used for wireless communication according to still another embodiment of the present application.

Referring to FIG. 8, a method 800 for a first node used for wireless communication according to an embodiment of the present application may further include Step S810 of receiving first signaling.

In an embodiment, the first signaling is transmitted on a third link.

In an embodiment, the first signaling includes SCI.

In an embodiment, the first signaling includes RRC information.

In an embodiment, the first signaling includes an RRC IE.

In an embodiment, the first signaling includes DCI.

In an embodiment, the first signaling includes one or more first type beam indexs.

In an embodiment, the first signaling includes one or more first type frequency domain resource indexs.

In an embodiment, the first signaling is used to determine the one or more first type synchronization signal blocks.

In an embodiment, the first signaling is used to determine a quantity of first type synchronization signal blocks.

In an embodiment, the first signaling is used to determine a time domain resource occupied by a first type synchronization signal block.

In an embodiment, the first signaling is used to determine a DMRS of a PBCH included in a first type synchronization signal block.

In an embodiment, the first signaling is used to determine first type information (such as a payload of a PBCH) of a PBCH included in a first type synchronization signal block.

In an embodiment, the first signaling is used to determine the one or more first type beams from a first set of beams. The first set of beams includes at least two first type beams.

In an embodiment, the first signaling includes one or more first type beam indexs, and the one or more first type beam indexs respectively correspond to one or more first type beams.

In an embodiment, the one or more first type beams are respectively used to receive the one or more first type synchronization signal blocks.

In an embodiment, the first signaling includes one or more first type beam indexs, and the one or more first type beam indexs respectively correspond to one or more first type beams. The one or more first type beams are respectively used to receive the one or more first type synchronization signal blocks.

In an embodiment, the first signaling includes one or more first type beam indexs, and the one or more first type beam indexs respectively correspond to one or more first type beams. The one or more first type beams are respectively used to transmit signals on the first link.

In an embodiment, the first signaling includes one or more first type frequency domain resource indexs, and the one or more first type frequency domain resource indexs respectively correspond to one or more first type frequency domain resources.

In an embodiment, the first signaling includes one or more first type frequency domain resource indexs, the one or more first type frequency domain resource indexs respectively correspond to one or more first type frequency domain resources, and the one or more first type frequency domain resources are respectively used to transmit the one or more first type synchronization signal blocks.

In an embodiment, the first signaling includes one or more first type frequency domain resource indexs, the one or more first type frequency domain resource indexs respectively correspond to one or more first type frequency domain resources, and the one or more first type frequency domain resources are respectively used to transmit signals on the first link.

In an embodiment, the first signaling is used to determine the one or more first type beams from a first set of beams. The first set of beams includes at least two first type beams.

In an embodiment, the one or more first type beams are respectively used to receive the one or more first type synchronization signal blocks.

It should be noted that, the beams mentioned in the embodiments of the present application may include or be replaced by at least one of the following: a beam, a physical beam, a logical beam, a spatial filter, a spatial domain filter, a spatial domain transmission filter, a spatial domain reception filter, and an antenna port.

The method for a first node used for wireless communication according to an embodiment of the present application is described above from the perspective of a first node with reference to FIG. 5 to FIG. 8. A method for a second node used for wireless communication according to an embodiment of the present application is described below from the perspective of a second node with reference to FIG. 9. The second node may be a node that originates or broadcasts a synchronization signal block in a communications system. In an embodiment, the second node may be a base station. It should be understood that descriptions of the first node and the second node correspond to each other, and therefore, for a part that is not described in detail, reference may be made to the foregoing description.

Figure 9:
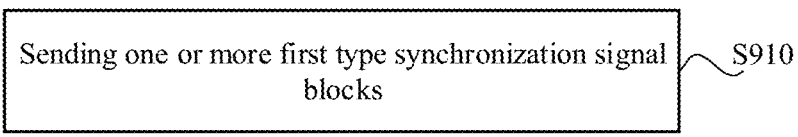
FIG. 9 is a schematic flowchart of a method for a first node used for wireless communication according to still another embodiment of the present application.

FIG. 9 is a schematic flow diagram of a method for a second node used for wireless communication according to an embodiment of the present application. The method 900 of FIG. 9 includes Step S910.

In Step S910, one or more first type synchronization signal blocks are sent. Each first type synchronization signal block in the one or more first type synchronization signal blocks includes first information; and an index of each first type synchronization signal block in the one or more first type synchronization signal blocks is one of a plurality of candidate synchronization signal block indexes.

The one or more first type synchronization signal blocks are used to trigger a first node to transmit one or more second type synchronization signal blocks, and each second type synchronization signal block in the one or more second type synchronization signal blocks includes the first information. An index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

In an embodiment, an index of at least one second type synchronization signal block in the one or more second type synchronization signal blocks is different from an index of any first type synchronization signal block in the one or more first type synchronization signal blocks.

In an embodiment, each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

In an embodiment, the plurality of candidate synchronization signal blocks respectively include a plurality of PBCHs, the plurality of PBCHs respectively carry a plurality of DMRSs, and a sequence index of each DMRS in the plurality of DMRSs corresponds to at least one of the plurality of candidate synchronization signal block indexes. Each second type synchronization signal block in the one or more second type synchronization signal blocks is one of the plurality of candidate synchronization signal blocks, and a sequence index of a DMRS of a PBCH included in at least one second type synchronization signal block in the one or more second type synchronization signal blocks is different from a sequence index of a DMRS of a PBCH included in any first type synchronization signal block in the one or more first type synchronization signal blocks.

In an embodiment, the plurality of candidate synchronization signal blocks respectively include a plurality of PBCHs, the plurality of PBCHs respectively carry a plurality of DMRSs, the plurality of PBCHs respectively include a plurality of pieces of first type information, and both first type information and a sequence index of a DMRS that are included in each PBCH in the plurality of PBCHs together correspond to one of the plurality of candidate synchronization signal block indexes. First type information or a sequence index of a DMRS in a PBCH included in at least one second type synchronization signal block in the one or more second type synchronization signal blocks is different from first type information or a sequence index of a DMRS in a PBCH included in any first type synchronization signal block in the one or more first type synchronization signal blocks.

In an embodiment, a time domain resource occupied by at least one second type synchronization signal block in the one or more second type synchronization signal blocks is different from a time domain resource occupied by any first type synchronization signal block in the one or more first type synchronization signal blocks.

In an embodiment, the method illustrated in FIG. 9 may further include transmitting first configuration information, where the first configuration information includes a parameter of the plurality of candidate synchronization signal blocks.

In an embodiment, the method illustrated in FIG. 9 further includes: transmitting second configuration information, where the second configuration information is used to determine whether at least one second type synchronization signal block in the one or more second type synchronization signal blocks is different from any first type synchronization signal block in the one or more first type synchronization signal blocks, or the second configuration information is used to determine a quantity of the one or more second type synchronization signal blocks.

In an embodiment, the second configuration information is configured by SCI, or the second configuration information is configured by OAM.

In an embodiment, each first type synchronization signal block in the one or more first type synchronization signal blocks is transmitted on a first link, and each second type synchronization signal block in the one or more second type synchronization signal blocks is transmitted on a second link.

In an embodiment, the method illustrated in FIG. 9 may further include: transmitting first signaling, where the first signaling is transmitted on a third link, and the first signaling is used to determine the one or more first type synchronization signal blocks.

In an embodiment, the first signaling includes one or more first type beam indexes, and the one or more first type beam indexes respectively correspond to one or more first type beams. The one or more first type beams are respectively used to transmit signals on the first link.

In an embodiment, the first signaling includes one or more first type frequency domain resource indexes, the one or more first type frequency domain resource indexes respectively correspond to one or more first type frequency domain resources, and the one or more first type frequency domain resources are respectively used to transmit the one or more first type synchronization signal blocks.

Figure 10:
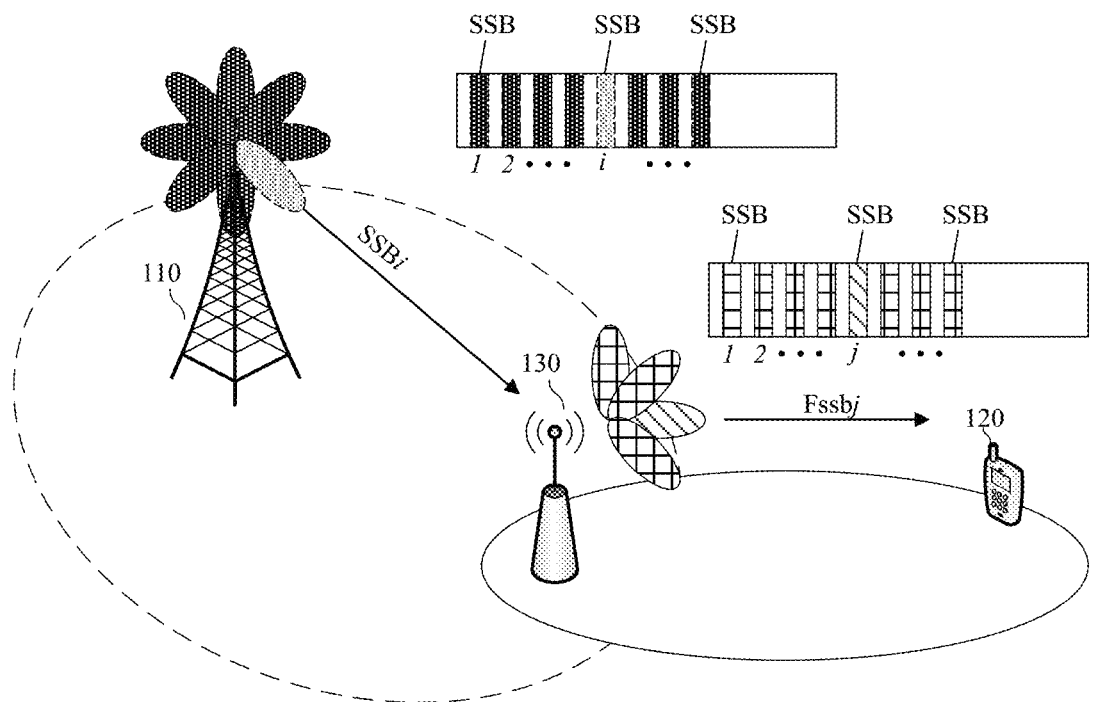
FIG. 10 is an example diagram of a possible signal forwarding mode of an NCR according to an embodiment of the present application.

Embodiments of the present application are described in more detail below in combination with a specific example. In the example illustrated in FIG. 10, an NCR corresponds to the first node mentioned above, a gNB corresponds to the second node mentioned above, and an SSB corresponds to the synchronization signal block mentioned above. It should be noted that the example illustrated in FIG. 10 is merely intended to assist those skilled in the art in understanding the embodiments of the present application, but not intended to use specific values or specific scenarios in the example to limit the embodiments of the present application. Apparently, those skilled in the art may make various equivalent modifications or variations based on the example illustrated in FIG. 10, and such modifications or variations also fall within the scope of embodiments of the present application.

Referring to FIG. 10, considering that MIB information carried in a plurality of SSBs sent by the gNB is the same except that a time domain resource indication is different, the plurality of SSBs are similar and sent repeatedly. Since an NCR-MT has received and decoded an SSB sent by the gNB at initial access, a transmission period and resource configuration of the SSB may also be learned from received system information. Configuration information acquired by the NCR-MT through the initial access may be pre-stored in the NCR. When SSBi is detected by an NCR-Fwd on a B-link, a plurality of Fssbs may be reconstructed on an A-link through the prestored configuration information. The reconstructed Fssbs correspond to content carried in and time-frequency resources occupied by the plurality of SSBs configured by the gNB. The NCR-Fwd may then transmit the reconstructed Fssbs in a beam sweeping manner, so that a UE can detect a better-quality Fssbj from the plurality of Fssbs to perform synchronization and initial access. It should be understood that, the Fssbj may be different from SSBi, or may be the same as SSBi.

Further, to ensure that the NCR is transparent to the UE, the Fssbs reconstructed and forwarded by the NCR-Fwd may be a subset (for example, a true subset) of the plurality of SSBs configured by the gNB. A quantity of Fssbs reconstructed and forwarded by the NCR-Fwd is not greater than a quantity of SSBs configured by the gNB, and the quantity of Fssbs reconstructed and forwarded by the NCR-Fwd may be configured by SCI or OAM according to a channel condition or a physical environment.

In addition, although the NCR-Fwd has an ability to reconstruct a plurality of Fssbs through one SSB, after all, the NCR is required to pre-store signals (such as DMRS, slot index, and half-frame index) and resource configuration information carried by the plurality of SSBs, so that an SSB reconstruction function of the NCR-Fwd may be enabled or disabled through SCI signaling or OAM configuration.

The methods embodiments of the present application are described in detail above with reference to FIG. 1 to FIG. 10. The apparatus embodiments of the present application are described in detail below with reference to FIG. 11 to FIG. 14. It should be understood that the description of the method embodiments corresponds to the description of the apparatus embodiments, and therefore, for parts that are not described in detail, reference may be made to the foregoing method embodiments.

Figure 11:
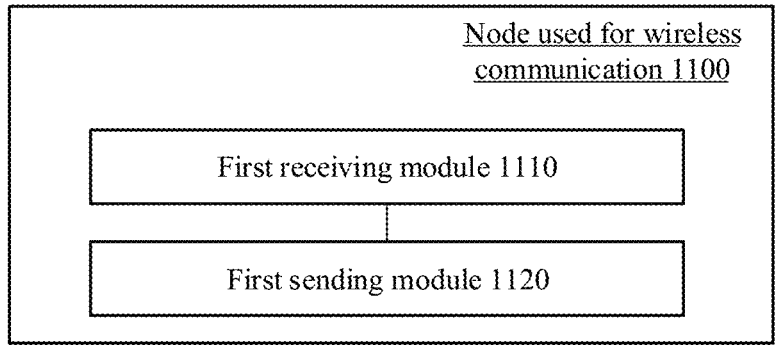
FIG. 11 is a schematic structural diagram of a node for wireless communication according to an embodiment of the present application.

FIG. 11 is a schematic structural diagram of a node for wireless communication according to an embodiment of the present application. The node 1100 may be the first node mentioned above. The first node may include a first receiving module 1110 and a first transmitting set 1120.

The first receiving module 1110 may be configured to receive one or more first type synchronization signal blocks, and each first type synchronization signal block in the one or more first type synchronization signal blocks includes first information. An index of each first type synchronization signal block in the one or more first type synchronization signal blocks is one of a plurality of candidate synchronization signal block indexes.

The first transmitting module 1120 may be configured to transmit one or more second type synchronization signal blocks, and each second type synchronization signal block in the one or more second type synchronization signal blocks includes the first information. An index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

In an embodiment, an index of at least one second type synchronization signal block in the one or more second type synchronization signal blocks is different from an index of any first type synchronization signal block in the one or more first type synchronization signal blocks.

In an embodiment, each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

In an embodiment, the plurality of candidate synchronization signal blocks respectively include a plurality of physical broadcast channels PBCHs, the plurality of PBCHs respectively carry a plurality of demodulation reference signals DMRSs, and a sequence index of each DMRS in the plurality of DMRSs corresponds to at least one of the plurality of candidate synchronization signal block indexes. Each second type synchronization signal block in the one or more second type synchronization signal blocks is one of the plurality of candidate synchronization signal blocks, and a sequence index of a DMRS of a PBCH included in at least one second type synchronization signal block in the one or more second type synchronization signal blocks is different from a sequence index of a DMRS of a PBCH included in any first type synchronization signal block in the one or more first type synchronization signal blocks.

In an embodiment, the plurality of candidate synchronization signal blocks respectively include a plurality of PBCHs, the plurality of PBCHs respectively carry a plurality of DMRSs, the plurality of PBCHs respectively include a plurality of pieces of first type information, and both first type information and a sequence index of a DMRS that are included in each PBCH in the plurality of PBCHs together correspond to one of the plurality of candidate synchronization signal block indexes; and first type information or a sequence index of a DMRS in a PBCH included in at least one second type synchronization signal block in the one or more second type synchronization signal blocks is different from first type information or a sequence index of a DMRS in a PBCH included in any first type synchronization signal block in the one or more first type synchronization signal blocks.

In an embodiment, a time domain resource occupied by at least one second type synchronization signal block in the one or more second type synchronization signal blocks is different from a time domain resource occupied by any first type synchronization signal block in the one or more first type synchronization signal blocks.

In an embodiment, the first node further includes a second receiving module, configured to receive first configuration information, where the first configuration information includes a parameter of the plurality of candidate synchronization signal blocks.

In an embodiment, the first node further includes a third receiving module, configured to receive second configuration information. The second configuration information is used to determine whether at least one second type synchronization signal block in the one or more second type synchronization signal blocks is different from any first type synchronization signal block in the one or more first type synchronization signal blocks, or the second configuration information is used to determine a quantity of the one or more second type synchronization signal blocks.

In an embodiment, the second configuration information is configured by side control information SCI, or the second configuration information is configured by operation administration and maintenance OAM.

In an embodiment, each first type synchronization signal block in the one or more first type synchronization signal blocks is transmitted on a first link, and each second type synchronization signal block in the one or more second type synchronization signal blocks is transmitted on a second link.

In an embodiment, the first node further includes a fourth receiving module, configured to receive first signaling. The first signaling is transmitted on a third link, and the first signaling is used to determine the one or more first type synchronization signal blocks.

In an embodiment, the first signaling includes one or more first type beam indexes, the one or more first type beam indexes respectively correspond to one or more first type beams, and the one or more first type beams are respectively used to transmit signals on the first link.

In an embodiment, the first signaling includes one or more first type frequency domain resource indexes, the one or more first type frequency domain resource indexes respectively correspond to one or more first type frequency domain resources, and the one or more first type frequency domain resources are respectively used to transmit the one or more first type synchronization signal blocks.

Figure 12:
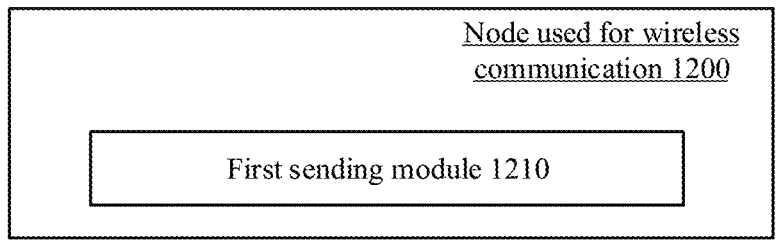
FIG. 12 is a schematic structural diagram of a node for wireless communication according to another embodiment of the present application.

FIG. 12 is a schematic structural diagram of a node for wireless communication according to another embodiment of the present application. The node 1200 may be the second node mentioned above. The second node may include a first sending module 1210.

The first transmitting module 1210 may be configured to transmit one or more first type synchronization signal blocks, and each first type synchronization signal block in the one or more first type synchronization signal blocks includes first information. An index of each first type synchronization signal block in the one or more first type synchronization signal blocks is one of a plurality of candidate synchronization signal block indexes.

The one or more first type synchronization signal blocks are used to trigger a first node to transmit one or more second type synchronization signal blocks, and each second type synchronization signal block in the one or more second type synchronization signal blocks includes the first information. An index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

In an embodiment, an index of at least one second type synchronization signal block in the one or more second type synchronization signal blocks is different from an index of any first type synchronization signal block in the one or more first type synchronization signal blocks.

In an embodiment, each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

In an embodiment, the plurality of candidate synchronization signal blocks respectively include a plurality of physical broadcast channels PBCHs, the plurality of PBCHs respectively carry a plurality of demodulation reference signals DMRSs, and a sequence index of each DMRS in the plurality of DMRSs corresponds to at least one of the plurality of candidate synchronization signal block indexes. Each second type synchronization signal block in the one or more second type synchronization signal blocks is one of the plurality of candidate synchronization signal blocks, and a sequence index of a DMRS of a PBCH included in at least one second type synchronization signal block in the one or more second type synchronization signal blocks is different from a sequence index of a DMRS of a PBCH included in any first type synchronization signal block in the one or more first type synchronization signal blocks.

In an embodiment, the plurality of candidate synchronization signal blocks respectively include a plurality of PBCHs, the plurality of PBCHs respectively carry a plurality of DMRSs, the plurality of PBCHs respectively include a plurality of pieces of first type information, and both first type information and a sequence index of a DMRS that are included in each PBCH in the plurality of PBCHs together correspond to one of the plurality of candidate synchronization signal block indexes; and first type information or a sequence index of a DMRS in a PBCH included in at least one second type synchronization signal block in the one or more second type synchronization signal blocks is different from first type information or a sequence index of a DMRS in a PBCH included in any first type synchronization signal block in the one or more first type synchronization signal blocks.

In an embodiment, a time domain resource occupied by at least one second type synchronization signal block in the one or more second type synchronization signal blocks is different from a time domain resource occupied by any first type synchronization signal block in the one or more first type synchronization signal blocks.

In an embodiment, the second node may further include a second transmitting module, configured to transmit first configuration information. The first configuration information includes a parameter of the plurality of candidate synchronization signal blocks.

In an embodiment, the second node may further include a third transmitting module, configured to transmit second configuration information. The second configuration information is used to determine whether at least one second type synchronization signal block in the one or more second type synchronization signal blocks is different from any first type synchronization signal block in the one or more first type synchronization signal blocks, or the second configuration information is used to determine a quantity of the one or more second type synchronization signal blocks.

In an embodiment, the second configuration information is configured by side control information SCI, or the second configuration information is configured by operation administration and maintenance OAM.

In an embodiment, each first type synchronization signal block in the one or more first type synchronization signal blocks is transmitted on a first link, and each second type synchronization signal block in the one or more second type synchronization signal blocks is transmitted on a second link.

In an embodiment, the second node further includes a fourth transmitting module, configured to transmit first signaling. The first signaling is transmitted on a third link, and the first signaling is used to determine the one or more first type synchronization signal blocks.

In an embodiment, the first signaling includes one or more first type beam indexes, the one or more first type beam indexes respectively correspond to one or more first type beams, and the one or more first type beams are respectively used to transmit signals on the first link.

In an embodiment, the first signaling includes one or more first type frequency domain resource indexes, the one or more first type frequency domain resource indexes respectively correspond to one or more first type frequency domain resources, and the one or more first type frequency domain resources are respectively used to transmit the one or more first type synchronization signal blocks.

Figure 13:
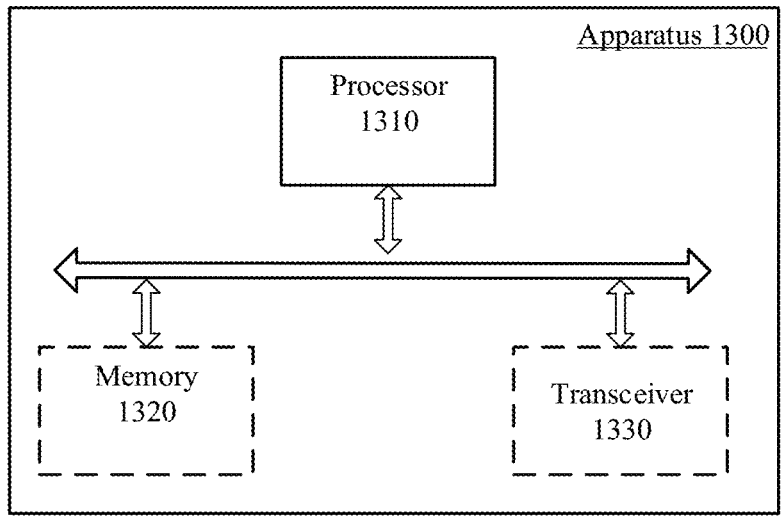
FIG. 13 is a schematic structural diagram of an apparatus according to an embodiment of the present application.

FIG. 13 is a schematic structural diagram of an apparatus according to an embodiment of the present application. The dashed lines in FIG. 13 indicate that the unit or module is optional. The apparatus 1300 may be configured to implement the methods described in the foregoing method embodiments. The apparatus 1300 may be a chip or a UE.

The apparatus 1300 may include one or more processors 1310. The processor 1310 may allow the apparatus 1300 to implement the methods described in the foregoing method embodiments. The processor 1310 may be a general-purpose processor or a dedicated processor. For example, the processor may be a central processing unit (CPU). Alternatively, the processor may be another general-purpose processor, a digital signal processor (DSP), an application-specific integrated circuit (ASIC), a field-programmable gate array (FPGA) or another programmable logic device, a discrete gate or transistor logic device, a discrete hardware component, or the like. The general-purpose processor may be a microprocessor, or the processor may be any conventional processor or the like.

The apparatus 1300 may further include one or more memories 1320. The memory 1320 stores a program that may be executed by the processor 1310 to cause the processor 1310 to perform the methods described in the foregoing method embodiments. The memory 1320 may be independent of the processor 1310 or may be integrated into the processor 1310.

The apparatus 1300 may further include a transceiver 1330. The processor 1310 may communicate with another device or chip through the transceiver 1330. For example, the processor 1310 may transmit and receive data to and from another device or chip through the transceiver 1330.

Figure 14:
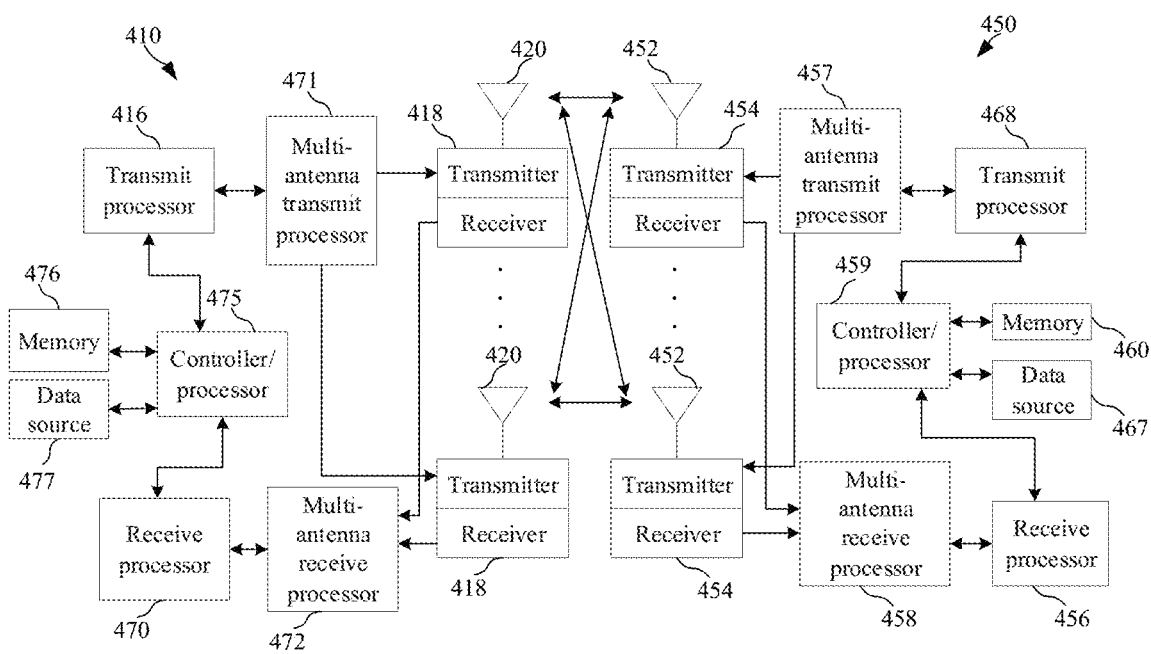
FIG. 14 is a schematic diagram of hardware modules of a communications device according to an embodiment of the present application.

FIG. 14 is a schematic diagram of hardware modules of a communications device according to an embodiment of the present application. Specifically, FIG. 14 is a block diagram of a first communications device 450 and a second communications device 410 communicating with each other in an access network.

The first communications device 450 includes a controller/processor 459, a memory 460, a data source 467, a transmit processor 468, a receive processor 456, a multi-antenna transmit processor 457, a multi-antenna receive processor 458, transmitters/receivers 454, and antennas 452.

The second communications device 410 includes a controller/processor 475, a memory 476, a data source 477, a receive processor 470, a transmit processor 416, a multi-antenna receive processor 472, a multi-antenna transmit processor 471, transmitters/receivers 418, and antennas 420.

In transmission from the second communications device 410 to the first communications device 450, at the second communications device 410, an upper layer data packet from a core network or an upper layer data packet from the data source 477 is provided to the controller/processor 475. The core network and the data source 477 represent all protocol layers above an L2 layer. The controller/processor 475 implements functions of the L2 layer. In the transmission from the second communications device 410 to the first communications device 450, the controller/processor 475 provides header compression, encryption, packet segmentation and reordering, multiplexing between a logical channel and a transport channel, and allocation to radio resources of the first communications device 450 based on various priority measurements. The controller/processor 475 is further responsible for retransmission of a lost packet, and signaling to the first communications device 450. The transmit processor 416 and the multi-antenna transmit processor 471 implement various signal processing functions of an L1 layer (namely, a physical layer). The transmit processor 416 implements encoding and interleaving to facilitate forward error correction at the second communications device 410, and mapping of signal clusters based on various modulation schemes (such as binary phase shift keying, quadrature phase shift keying, M-phase shift keying, and M-quadrature amplitude modulation). The multi-antenna transmit processor 471 performs digital space precoding, including codebook-based precoding and non-codebook-based precoding, on a coded and modulated symbol, and beamforming processing, to generate one or more spatial streams. The transmit processor 416 then maps each spatial stream to a subcarrier, multiplexes the mapped spatial stream with a reference signal (for example, a pilot) in time domain and/or frequency domain, and then uses an inverse fast Fourier transform to generate a physical channel that carries a time-domain multi-carrier symbol stream. Subsequently, the multi-antenna transmit processor 471 performs an operation of analog precoding transmitting/beamforming on the time-domain multi-carrier symbol stream. Each transmitter 418 converts a baseband multi-carrier symbol stream provided by the multi-antenna transmit processor 471 into a radio frequency stream, and then provides the radio frequency stream for different antennas 420.

In the transmission from the second communications device 410 to the first communications device 450, at the first communications device 450, each receiver 454 receives a signal through its corresponding antenna 452. Each receiver 454 recovers information modulated onto a radio frequency carrier, converts a radio frequency stream into a baseband multi-carrier symbol stream, and provides the baseband multi-carrier symbol stream for the receive processor 456. The receive processor 456 and the multi-antenna receive processor 458 implement various signal processing functions of the L1 layer. The multi-antenna receive processor 458 performs an operation of analog precoding receiving/beamforming on the baseband multi-carrier symbol stream from the receiver 454. The receive processor 456 converts, from time domain to frequency domain via fast Fourier transform, the baseband multi-carrier symbol stream obtained after the operation of analog precoding receiving/beamforming. In frequency domain, a physical-layer data signal and a reference signal are demultiplexed by the receive processor 456. The reference signal is used for channel estimation; and the data signal is recovered after multi-antenna detection performed by the multi-antenna receive processor 458, to obtain any spatial stream that uses the first communications device 450 as a destination. Symbols on each spatial stream are demodulated and recovered in the receive processor 456, and a soft decision is generated. The receive processor 456 then decodes and de-interleaves the soft decision to recover upper layer data and a control signal transmitted by the second communications device 410 on a physical channel. The upper layer data and the control signal are then provided to the controller/processor 459. The controller/processor 459 implements functions of the L2 layer. The controller/processor 459 may be associated with a memory 460 that stores program codes and data. The memory 460 may be referred to as a computer-readable medium. In the transmission from the second communications device 410 to the first communications device 450, the controller/processor 459 provides demultiplexing between a transport channel and a logical channel, packet reassembly, decryption, header decompression, and control signal processing, to recover an upper layer data packet from the second communications device 410. The upper layer packet is then provided to all protocol layers above the L2 layer, or various control signals may be provided to the L3 layer for processing by the L3 layer.

In transmission from the first communications device 450 to the second communications device 410, at the first communications device 450, an upper layer data packet is provided to the controller/processor 459 by using the data source 467. The data source 467 represents all protocol layers above the L2 layer. Similar to the transmit function at the second communications device 410 described in the transmission from the second communications device 410 to the first communications device 450, the controller/processor 459 implements header compression, encryption, packet segmentation and reordering, and multiplexing between a logical channel and a transport channel, to implement L2 layer functions for a user plane and a control plane. The controller/processor 459 is further responsible for retransmission of a lost packet, and signaling to the second communications device 410. The transmit processor 468 performs modulation and mapping, and channel coding processing. The multi-antenna transmit processor 457 performs digital multi-antenna spatial precoding, including codebook-based precoding and non-codebook-based precoding, and beamforming processing. Then the transmit processor 468 modulates a generated spatial stream into a multi-carrier/single-carrier symbol stream, and the multi-carrier/single-carrier symbol stream is provided to different antennas 452 via the transmitter 454 after undergoing an analog precoding/beamforming operation in the multi-antenna transmit processor 457. Each transmitter 454 first converts a baseband symbol stream provided by the multi-antenna transmit processor 457 into a radio frequency symbol stream, and then provides the radio frequency symbol stream for the antennas 452.

In the transmission from the first communications device 450 to the second communications device 410, a function at the second communications device 410 is similar to the receive function at the first communications device 450 described in the transmission from the second communications device 410 to the first communications device 450. Each receiver 418 receives a radio frequency signal through its corresponding antenna 420, converts the received radio frequency signal into a baseband signal, and provides the baseband signal for the multi-antenna receive processor 472 and the receive processor 470. The receive processor 470 and the multi-antenna receive processor 472 jointly implement functions of the L1 layer. The controller/processor 475 implements functions of the L2 layer. The controller/processor 475 may be associated with a memory 476 that stores program codes and data. The memory 476 may be referred to as a computer-readable medium. In the transmission from the first communications device 450 to the second communications device 410, the controller/processor 475 provides demultiplexing between a transport channel and a logical channel, packet reassembly, decryption, header decompression, and control signal processing, to recover an upper layer data packet from the first communications device 450. The upper layer data packet from the controller/processor 475 may be provided to a core network or all protocol layers above the L2 layer, or various control signals may be provided to the core network or the L3 layer for processing by the L3 layer.

In an embodiment, the first communications device 450 includes least one processor and at least one memory. The at least one memory includes computer program code. The at least one memory and the computer program code are configured to be used together with the at least one processor.

In an embodiment, the first communications device 450 includes: a memory for storing a computer-readable instruction program, where the computer-readable instruction program generates actions when being executed by at least one processor. The first communications device 450 is at least configured to: receive one or more first type synchronization signal blocks, wherein each first type synchronization signal block in the one or more first type synchronization signal blocks comprises first information; and an index of each first type synchronization signal block in the one or more first type synchronization signal blocks is one of a plurality of candidate synchronization signal block indexes; and, transmit one or more second type synchronization signal blocks, wherein each second type synchronization signal block in the one or more second type synchronization signal blocks comprises the first information; and an index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

In an embodiment, the first communications device 450 corresponds to the first node in the present application.

In an embodiment, the second communications device 410 corresponds to the second node in the present application.

In an embodiment, the first communications device 450 is a UE.

In an embodiment, the first communications device 450 is a UE that supports V2X.

In an embodiment, the first communications device 450 is a UE that supports D2D.

In an embodiment, the first communications device 450 is a network-controlled repeater.

In an embodiment, the first communications device 450 is a relay.

In an embodiment, the second communications device 410 is a base station.

In an embodiment, the antenna 452, the receiver 454, the multi-antenna receive processor 458, the receive processor 456, and the controller/processor 459 are configured to receive the first synchronization signal block in the present application.

In an embodiment, the antenna 420, the transmitter 418, the multi-antenna transmit processor 471, the transmit processor 416, and the controller/processor 475 are configured to transmit one or more synchronization signal blocks in the present application, and the first synchronization signal block is one of the one or more synchronization signal blocks.

In an embodiment, the antenna 452, the transmitter 454, the multi-antenna transmit processor 457, the transmit processor 468, and the controller/processor 459 are configured to transmit the first preamble group in the present application.

In an embodiment, the antenna 420, the receiver 418, the multi-antenna receive processor 472, the receive processor 470, and the controller/processor 475 are configured to receive the first preamble group in the present application.

An embodiment of the present application further provides a computer-readable storage medium for storing a program. The computer-readable storage medium may be applied to a node provided in the embodiments of the present application, and the program causes a computer to perform the methods to be performed by a node in various embodiments of the present application.

An embodiment of the present application further provides a computer program product. The computer program product includes a program. The computer program product may be applied to a node provided in the embodiments of the present application, and the program causes a computer to perform the methods to be performed by a node in various embodiments of the present application.

An embodiment of the present application further provides a computer program. The computer program may be applied to a node provided in the embodiments of the present application, and the computer program causes a computer to perform the methods to be performed by a node in various embodiments of the present application.

It should be understood that the terms "system" and "network" in the present application may be used interchangeably. In addition, the terms used in the present application are only used to explain the specific embodiments of the present application, and are not intended to limit the present application. The terms "first", "second", "third", "fourth", and the like in the specification, claims, and drawings of the present application are used to distinguish between different objects, rather than to describe a specific order. In addition, the terms "comprise/include" and "have" and any variations thereof are intended to cover a non-exclusive inclusion.

In the embodiments of the present application, "indicate" mentioned herein may refer to a direct indication, or may refer to an indirect indication, or may mean that there is an association relationship. For example, A indicates B, which may mean that A directly indicates B, for example, B may be obtained by means of A; or may mean that A indirectly indicates B, for example, A indicates C, and B may be obtained by means of C; or may mean that there is an association relationship between A and B.

In the embodiments of the present application, "B that is corresponding to A" means that B is associated with A, and B may be determined based on A. However, it should also be understood that, determining B based on A does not mean determining B based only on A, but instead B may be determined based on A and/or other information.

In the embodiments of the present application, the term "correspond" may mean that there is a direct or indirect correspondence between the two, or may mean that there is an association relationship between the two, or may mean that there is a relationship such as indicating and being indicated, or configuring and being configured.

In the embodiments of the present application, "pre-defined" or "pre-configured" may be implemented by pre-storing corresponding codes, tables, or other forms that may be used to indicate related information in devices (for example, including a UE and a network device), and a specific implementation thereof is not limited in the present application. For example, pre-defined may refer to defined in the protocol.

In the embodiments of the present application, the "protocol" may refer to a standard protocol in the communications field, and may include, for example, an LTE protocol, an NR protocol, and a related protocol applied to a future communications system, which is not limited in the present application.

In the embodiments of the present application, the term "and/or" is merely an association relationship that describes associated objects, and represents that there may be three relationships. For example, A and/or B may represent three cases: only A exists, both A and B exist, and only B exists. In addition, the character "/" herein generally indicates an "or" relationship between the associated objects.

In the embodiments of the present application, sequence numbers of the foregoing processes do not mean execution sequences. The execution sequences of the processes should be determined according to functions and internal logic of the processes, and should not be construed as any limitation on the implementation processes of the embodiments of the present application.

In several embodiments provided in the present application, it should be understood that, the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit.

All or some of the foregoing embodiments may be implemented by using software, hardware, firmware, or any combination thereof. When software is used to implement embodiments, the foregoing embodiments may be implemented completely or partially in a form of a computer program product. The computer program product includes one or more computer instructions. When the computer program instructions are loaded and executed on a computer, the procedures or functions according to the embodiments of the present application are completely or partially generated. The computer may be a general-purpose computer, a dedicated computer, a computer network, or another programmable apparatus. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state drive (SSD)), or the like.

The foregoing descriptions are merely specific implementations of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be subject to the protection scope of the claims.

What is claimed is:

1. A first node, comprising:
    at least one processor; and
    one or more memories coupled to the at least one processor and storing programming instructions for execution by the at least one processor to cause the first node to:
        receive one or more first type synchronization signal blocks, wherein each first type synchronization signal block in the one or more first type synchronization signal blocks comprises first information; and an index of each first type synchronization signal block in the one or more first type synchronization signal blocks is one of a plurality of candidate synchronization signal block indexes; and
        transmit one or more second type synchronization signal blocks, wherein each second type synchronization signal block in the one or more second type synchronization signal blocks comprises the first information; and an index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

2. The first node according to claim 1, wherein an index of at least one second type synchronization signal block in the one or more second type synchronization signal blocks is different from an index of any first type synchronization signal block in the one or more first type synchronization signal blocks.

3. The first node according to claim 1, wherein each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

4. The first node according to claim 3, wherein the plurality of candidate synchronization signal blocks respectively comprise a plurality of physical broadcast channels (PBCHs), the plurality of PBCHs respectively carry a plurality of demodulation reference signals (DMRSs), and a sequence index of each DMRS in the plurality of DMRSs corresponds to at least one of the plurality of candidate synchronization signal block indexes; and each second type synchronization signal block in the one or more second type synchronization signal blocks is one of the plurality of candidate synchronization signal blocks, and a sequence index of a DMRS of a PBCH comprised in at least one second type synchronization signal block in the one or more second type synchronization signal blocks is different from a sequence index of a DMRS of a PBCH comprised in any first type synchronization signal block in the one or more first type synchronization signal blocks.

5. The first node according to claim 3, wherein the plurality of candidate synchronization signal blocks respectively comprise a plurality of PBCHs, the plurality of PBCHs respectively carry a plurality of DMRSs, the plurality of PBCHs respectively comprise a plurality of pieces of first type information, and both first type information and a sequence index of a DMRS that are comprised in each PBCH in the plurality of PBCHs together correspond to one of the plurality of candidate synchronization signal block indexes; and first type information or a sequence index of a DMRS in a PBCH comprised in at least one second type synchronization signal block in the one or more second type synchronization signal blocks is different from first type information or a sequence index of a DMRS in a PBCH comprised in any first type synchronization signal block in the one or more first type synchronization signal blocks.

6. The first node according to claim 1, wherein a time domain resource occupied by at least one second type synchronization signal block in the one or more second type synchronization signal blocks is different from a time domain resource occupied by any first type synchronization signal block in the one or more first type synchronization signal blocks.

7. The first node according to claim 3, wherein the programming instructions, when executed by the at least one processor, cause the first node to:
receive first configuration information, wherein the first configuration information comprises a parameter of the plurality of candidate synchronization signal blocks.

8. The first node according to claim 1, wherein the programming instructions, when executed by the at least one processor, cause the first node to:
receive second configuration information, wherein the second configuration information indicates whether at least one second type synchronization signal block in the one or more second type synchronization signal blocks is different from any first type synchronization signal block in the one or more first type synchronization signal blocks, or the second configuration information indicates a quantity of the one or more second type synchronization signal blocks, or the second configuration information is used to determine the one or more second type synchronization signal blocks.

9. The first node according to claim 8, wherein the second configuration information is included in side control information (SCI), or the second configuration information is configured by operation administration and maintenance (OAM).

10. The first node according to claim 1, wherein each first type synchronization signal block in the one or more first type synchronization signal blocks is received on a backhual link, and each second type synchronization signal block in the one or more second type synchronization signal blocks is transmitted on an access link.

11. The first node according to claim 1, wherein the programming instructions, when executed by the at least one processor, cause the first node to:
receive a first signaling,
wherein the first signaling is received on a control link, and the first signaling indicates the one or more first type synchronization signal blocks.

12. The first node according to claim 11, wherein the first signaling comprises one or more first type beam indexes, the one or more first type beam indexes respectively correspond to one or more first type beams, and the one or more first type beams are respectively used to receive signals on a backhaul link.

13. The first node according to claim 12, wherein the one or more first type beams are respectively used to receive the one or more first type synchronization signal blocks.

14. A second node, comprising:
at least one processor; and
one or more memories coupled to the at least one processor and storing programming instructions for execution by the at least one processor to cause the second node to:
transmit one or more first type synchronization signal blocks to a first node, wherein each first type synchronization signal block in the one or more first type synchronization signal blocks comprises first information; and an index of each first type synchronization signal block in the one or more first type synchronization signal blocks is one of a plurality of candidate synchronization signal block indexes;
wherein the first node is configured to transmit one or more second type synchronization signal blocks, each second type synchronization signal block in the one or more second type synchronization signal blocks comprises the first information; and an index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

15. The second node according to claim 14, wherein an index of at least one second type synchronization signal block in the one or more second type synchronization signal blocks is different from an index of any first type synchronization signal block in the one or more first type synchronization signal blocks.

16. The second node according to claim 14, wherein each first type synchronization signal block in the one or more first type synchronization signal blocks is one of a plurality of candidate synchronization signal blocks in a first period, and the plurality of candidate synchronization signal block indexes respectively correspond to the plurality of candidate synchronization signal blocks in the first period.

17. The second node according to claim 16, wherein the plurality of candidate synchronization signal blocks separately comprise a plurality of physical broadcast channels PBCHs, the plurality of PBCHs separately carry a plurality of demodulation reference signals DMRSs, and a sequence index of any DMRS in the plurality of DMRSs corresponds to at least one of the plurality of candidate synchronization signal block indexes; and any second type synchronization signal block in the one or more second type synchronization signal blocks is one of the plurality of candidate synchronization signal blocks, and a sequence index of a DMRS of a PBCH comprised in at least one second type synchronization signal block in the one or more second type synchronization signal blocks is different from a sequence index of a DMRS of a PBCH comprised in any first type synchronization signal block in the one or more first type synchronization signal blocks.

18. The second node according to claim 16, wherein the plurality of candidate synchronization signal blocks separately comprise a plurality of PBCHs, the plurality of PBCHs separately carry a plurality of DMRSs, the plurality of PBCHs separately comprise a plurality of pieces of first type information, and first type information and a sequence index of a DMRS that are comprised in any PBCH in the plurality of PBCHs together correspond to one of the plurality of candidate synchronization signal block indexes; and first type information or a sequence index of a DMRS in a PBCH comprised in at least one second type synchronization signal block in the one or more second type synchronization signal block is different from first type information or a sequence index of a DMRS in a PBCH comprised in any first type synchronization signal block in the one or more first type synchronization signal blocks.

19. The second node according to claim 14, wherein a time domain resource occupied by at least one second type synchronization signal block in the one or more second type synchronization signal blocks is different from a time domain resource occupied by any first type synchronization signal block in the one or more first type synchronization signal blocks.

20. A method, comprising:
receiving, by a first node, one or more first type synchronization signal blocks, wherein each first type synchronization signal block in the one or more first type synchronization signal blocks comprises first information; and an index of each first type synchronization signal block in the one or more first type synchronization signal blocks is one of a plurality of candidate synchronization signal block indexes; and
transmitting, by the first node, one or more second type synchronization signal blocks, wherein each second type synchronization signal block in the one or more second type synchronization signal blocks comprises the first information; and an index of each second type synchronization signal block in the one or more second type synchronization signal blocks is one of the plurality of candidate synchronization signal block indexes, and at least one second type synchronization signal block in the one or more second type synchronization signal blocks is different from any first type synchronization signal block in the one or more first type synchronization signal blocks.

* * * * *